(12) United States Patent
Chen et al.

(10) Patent No.: US 9,130,891 B2
(45) Date of Patent: Sep. 8, 2015

(54) METHOD AND APPARATUS FOR QUICKLY ADDING RECIPIENT AND MOBILE TERMINAL

(71) Applicant: Huawei Device Co., Ltd., Shenzhen (CN)

(72) Inventors: Zhigang Chen, Shenzhen (CN); Yi Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 159 days.

(21) Appl. No.: 13/886,584

(22) Filed: May 3, 2013

(65) Prior Publication Data

US 2013/0246545 A1 Sep. 19, 2013

Related U.S. Application Data

(63) Continuation of application No. PCT/CN2011/081663, filed on Nov. 2, 2011.

(30) Foreign Application Priority Data

Nov. 4, 2010 (CN) .......................... 2010 1 0530703

(51) Int. Cl.
*G06F 15/16* (2006.01)
*H04L 12/58* (2006.01)
(Continued)

(52) U.S. Cl.
CPC .............. *H04L 51/00* (2013.01); *G06Q 10/107* (2013.01); *H04L 51/28* (2013.01); *H04M 1/72552* (2013.01); *H04L 51/38* (2013.01); *H04W 4/08* (2013.01); *H04W 4/12* (2013.01)

(58) Field of Classification Search
CPC ......... H04L 51/28; H04L 51/00; H04L 51/38; H04M 1/72552; G06Q 10/107; H04W 4/12; H04W 4/08
USPC ......................................... 709/206
See application file for complete search history.

(56) References Cited

U.S. PATENT DOCUMENTS

| 6,360,251 B1 | 3/2002 | Fujita et al. | |
| 2004/0135816 A1* | 7/2004 | Schwartz et al. | ............. 345/811 |

(Continued)

FOREIGN PATENT DOCUMENTS

| CN | 1988540 A | 6/2007 |
| CN | 101072192 A | 11/2007 |

(Continued)

OTHER PUBLICATIONS

Foreign Communication From a Counterpart Application, European Application No. 11837573.2, Extended European Search Report dated Oct. 15, 2013, 6 pages.

(Continued)

*Primary Examiner* — Kostas Katsikis
(74) *Attorney, Agent, or Firm* — Conley Rose, P.C.; Grant Rodolph; Nicholas K. Beaulieu

(57) ABSTRACT

A method for quickly adding a recipient includes: receiving mail information, where the mail information includes information of at least two recipients; creating a recipient group according to the recipient information; and when a user needs to add a recipient to send a mail, if the added contact is in the recipient group, displaying information of other recipients in the recipient group, and prompting the user whether to add other recipients. The technical solutions of embodiments of the present invention make an operation of adding a recipient quite flexible and intelligent, and provide an intelligent group contact recommendation function, so that the user can quickly add a contact when sending a mail or information.

19 Claims, 2 Drawing Sheets

(51) Int. Cl.
*H04M 1/725* (2006.01)
*G06Q 10/10* (2012.01)
*H04W 4/08* (2009.01)
*H04W 4/12* (2009.01)

(56) References Cited

U.S. PATENT DOCUMENTS

| | | |
|---|---|---|
| 2006/0221957 A1 | 10/2006 | Ozawa et al. |
| 2007/0050455 A1 | 3/2007 | Yach et al. |
| 2007/0143424 A1 | 6/2007 | Schirmer et al. |
| 2007/0290787 A1 | 12/2007 | Fiatal et al. |
| 2007/0294428 A1* | 12/2007 | Guy et al. .............. 709/245 |
| 2008/0072143 A1* | 3/2008 | Assadollahi .............. 715/261 |
| 2008/0235334 A1 | 9/2008 | Gupta et al. |
| 2009/0111447 A1 | 4/2009 | Nurmi |
| 2009/0327438 A1 | 12/2009 | Cheng et al. |
| 2010/0299397 A1* | 11/2010 | Sambrani et al. .............. 709/206 |
| 2011/0009101 A1* | 1/2011 | Cho et al. .............. 455/414.1 |
| 2013/0031172 A1* | 1/2013 | Olsen et al. .............. 709/204 |

FOREIGN PATENT DOCUMENTS

| | | |
|---|---|---|
| CN | 101102576 A | 1/2008 |
| CN | 101282531 A | 10/2008 |
| CN | 101616102 A | 12/2009 |
| CN | 101980552 A | 2/2011 |
| EP | 0964343 A2 | 12/1999 |
| JP | 2001045046 A | 2/2001 |
| JP | 2002140261 A | 5/2002 |
| JP | 2006287790 A | 10/2006 |
| JP | 2009247005 A | 10/2009 |
| WO | 2009056947 A2 | 5/2009 |

OTHER PUBLICATIONS

Foreign Communication From a Counterpart Application, Japanese Application No. 2013-536991, Japanese Office Action dated Apr. 15, 2014, 3 pages.
Foreign Communication From a Counterpart Application, Japanese Application No. 2013-536991, English Translation of Japanese Office Action dated Apr. 15, 2014, 3 pages.
Partial English Translation and Abstract of Chinese Patent Application No. JP2002-140261A, May 30, 2014, 14 pages.
Partial English Translation and Abstract of Chinese Patent Application No. JP2009-247005A, May 30, 2014, 19 pages.
Partial English Translation and Abstract of Chinese Patent Application No. JP2001045046A, May 30, 2014, 15 pages.
Foreign Communication From a Counterpart Application, PCT Application PCT/CN2011/081663, Chinese Search Report dated Jan. 5, 2012, 4 pages.
Foreign Communication From a Counterpart Application, PCT Application PCT/CN2011/081663, English Translation of Search Report dated Jan. 5, 2012, 3 pages.

* cited by examiner

METHOD AND APPARATUS FOR QUICKLY ADDING RECIPIENT AND MOBILE TERMINAL

CROSS-REFERENCE TO RELATED APPLICATIONS

This application is a continuation of International Application No. PCT/CN2011/081663, filed on Nov. 2, 2011, which claims priority to Chinese Patent Application No. 201010530703.7, filed on Nov. 4, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of data processing technologies, and in particular, to a method and an apparatus for quickly adding a recipient and a mobile terminal.

BACKGROUND

At present, a mobile terminal (for example, a mobile phone) often needs to select contacts one by one when initiating contacting such as sending a multimedia message to the contacts or sending a mail to the contacts simultaneously, so an intelligent contact group mechanism, which can actively push correlated contact information to a user for selecting, cannot be formed. Moreover, the current mobile terminals provide no intelligent contact group function, and cannot automatically extract the correlation of recipients from a received mail or multimedia message. In the prior art, by setting a group function in contacts, the user actively creates a group and adds related contacts to form a relatively stable group, so as to perform the function of sending a mail to a group afterwards.

In the process of implementing the embodiments of the present invention, the inventor found that the above technical solution can only make the user send a mail to a group, but cannot make the user select one or more contacts in the group. The solution is neither sufficiently flexible nor intelligent, and provides no intelligent group contact recommendation function, so when sending mails or information, the user cannot quickly add contacts, which is inconvenient for the user.

SUMMARY

On this account, an embodiment of the present invention provides a method for quickly adding a recipient, where the method includes: receiving mail information, where the mail information includes information of at least two recipients; creating a recipient group according to the recipient information; and when a user needs to add a recipient to send a mail, if the added contact is in the recipient group, displaying information of other recipients in the recipient group, and prompting the user whether to add other recipients.

An embodiment of the present invention further provides an apparatus for quickly adding a recipient, where the apparatus includes: a receiving unit, a group unit, a processing unit and a prompt unit, where: the receiving unit is configured to receive mail information, where the mail information includes information of at least two recipients; the group unit is configured to create a recipient group according to the recipient information; the processing unit is configured to, when a user needs to add a recipient to send a mail, if the added contact is in the recipient group, instruct the prompt unit to display information of other recipients in the recipient group, and prompt the user whether to add other recipients; and the prompt unit is configured to, according to the instruction of the processing unit, display information of other recipients in the recipient group, and prompt the user whether to add other recipients.

Furthermore, the apparatus may include: a sequencing unit configured to, according to a predetermined arrangement rule, sequentially arrange information of other recipients in the recipient group, and send the information to the prompt unit for prompting.

An embodiment of the present invention further provides a mobile terminal, which includes a communication module, a keyboard and a power supply management module, and the mobile terminal further includes the above apparatus.

In the embodiments of the present invention, the technical solutions of intelligently creating a recipient group; when a user needs to add a recipient to send a mail, if the added contact is in the recipient group, instructing the prompt unit to display information of other recipients in the recipient group; and prompting the user whether to add other recipients, makes an operation of adding a recipient quite flexible and intelligent, and provides an intelligent group contact recommendation function, so that the user can quickly add a contact when sending a mail or information.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons skilled in the art may still derive other drawings from these accompanying drawings without creative efforts.

DETAILED DESCRIPTION

The following clearly describes the technical solutions in the embodiments of the present invention with reference to the accompanying drawings. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
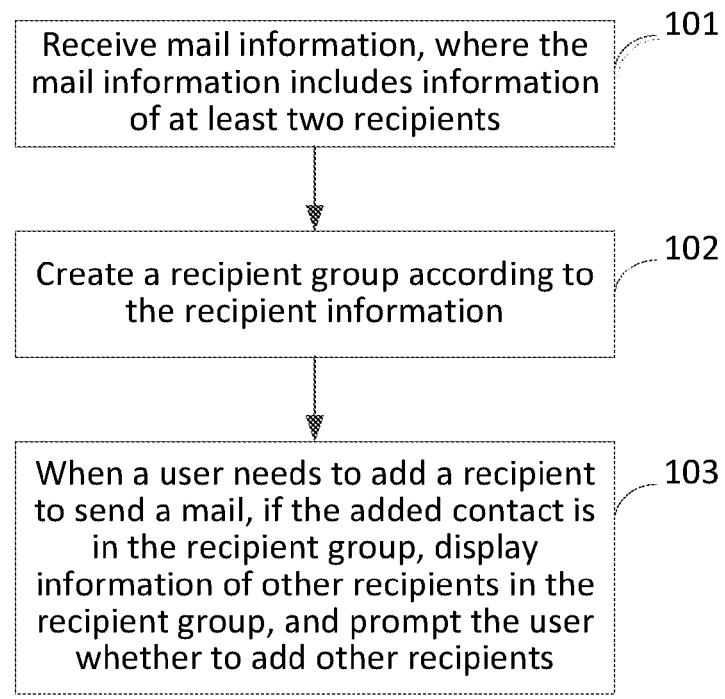
FIG. 1 is a flow chart of a method according to Embodiment 1 of the present invention.

Embodiment 1 of the present invention provides a method for quickly adding a recipient. Referring to FIG. 1, the method specifically includes the following steps.

Step 101: Receive mail information, where the mail information includes information of at least two recipients. The mail information may specifically be email information, or a short message received through a short message service center (SMSC) of a network side. The mail information includes information such as sender information, recipient information and mail content. In the embodiment of the present invention, the recipient information at least includes two recipients.

Step 102: Create a recipient group according to the recipient information. The above recipient information at least includes two recipients, so a group may be created according to the recipient information. It can be understood that a recipient group may be a temporary group, or may be a permanent group. The temporary group is a recipient group created temporarily, and is only stored temporarily in the cache of a mobile terminal, and once the mobile terminal is reset (for example, restarted), the temporary group is deleted from the system of the mobile terminal. The permanent group is a recipient group stored in the storage space of the mobile terminal.

Step 103: When a user needs to add a recipient to send a mail, if the added contact is in the recipient group, display information of other recipients in the recipient group, and prompt the user whether to add other recipients.

For example, in step 102, a recipient group A is created. The recipient group A is formed by information of three recipients: recipient a, recipient b and recipient c. When writing a mail, the user needs to add a recipient, for example, add recipient information as contact a, a system determines whether the contact a is in the recipient group A, if yes, displays information of the recipient b and the recipient c, and prompts the user whether it is also required to add the recipient b and the recipient c to a recipient field.

Furthermore, displaying information of other recipients in the recipient group may specifically include: according to a predetermined arrangement rule, sequentially arranging and displaying information of other recipients in the recipient group. Sequentially arranging information of other recipients according to the predetermined arrangement rule may specifically be: arranging information of other recipients according to initials of the recipient information, or arranging information of other recipients according to Chinese character strokes in the recipient information. It can be understood that, the arrangement rule in the embodiment of the present invention includes, but is not limited to, the above rules. By arranging information of other recipients, the user can learn information of other recipients intuitively, and add a recipient more quickly.

In addition, the specific method for prompting the user whether it is required to add other recipients includes: prompting the user through voice or prompting the user by displaying, on a screen, information to be added. It can be understood that, the prompt manner in the embodiment of the present invention includes, but is not limited to, the above prompt manners.

In the embodiment of the present invention, the technical solution of intelligently creating a recipient group; when a user needs to add a recipient to send a mail, if the added contact is in the recipient group, instructing a prompt unit to display information of other recipients in the recipient group; and prompting the user whether to add other recipients, makes an operation of adding a recipient quite flexible and intelligent, and provides an intelligent group contact recommendation function, so that the user can quickly add a contact when sending a mail or information.

Embodiment 2

Figure 2:
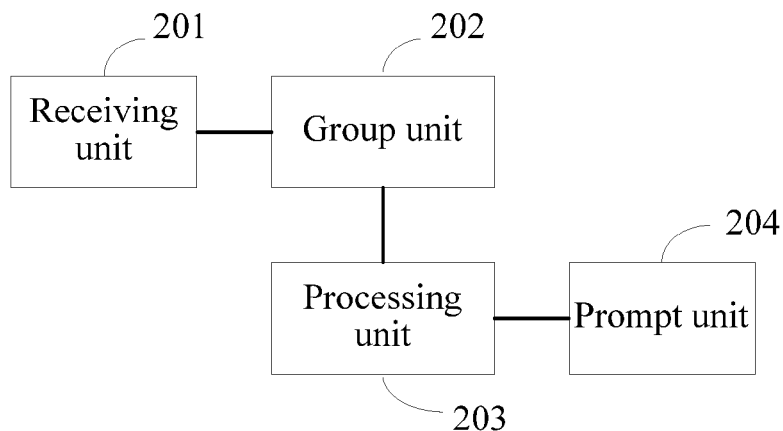
FIG. 2 is a schematic diagram of an apparatus according to Embodiment 2 of the present invention.

Embodiment 2 of the present invention provides an apparatus for quickly adding a recipient. As shown in FIG. 2, the apparatus includes: a receiving unit 201, a group unit 202, a processing unit 203 and a prompt unit 204, where: the receiving unit 201 is configured to receive mail information, where the mail information includes information of at least two recipients; and the mail information may specifically be email information, or a short message received through an SMSC of a network side. The mail information includes information such as sender information, recipient information and mail content. In the embodiment of the present invention, the recipient information at least includes two recipients; the group unit 202 is configured to create a recipient group according to the recipient information. The recipient information at least includes two recipients, so a group may be created according to the recipient information. It can be understood that the recipient group may be a temporary group or a permanent group. The temporary group is a recipient group created temporarily, and is only stored temporarily in the cache of a mobile terminal, and once the mobile terminal is reset (for example, restarted), the temporary group is deleted from the system of the mobile terminal. The permanent group is a recipient group stored in the storage space of the mobile terminal; the processing unit 203 is configured to, when a user needs to add a recipient to send a mail, if the added contact is in the recipient group, instruct the prompt unit to display information of other recipients in the recipient group, and prompt the user whether to add other recipients; and the prompt unit 204 is configured to, according to the instruction of the processing unit, display information of other recipients in the recipient group, and prompt the user whether to add other recipients. The specific method for prompting the user whether it is required to add other recipients includes: prompting the user through voice or prompting the user by displaying, on a screen, information to be added. It can be understood that, the prompt manner in the embodiment of the present invention includes, but is not limited to, the above prompt manners.

Figure 3:
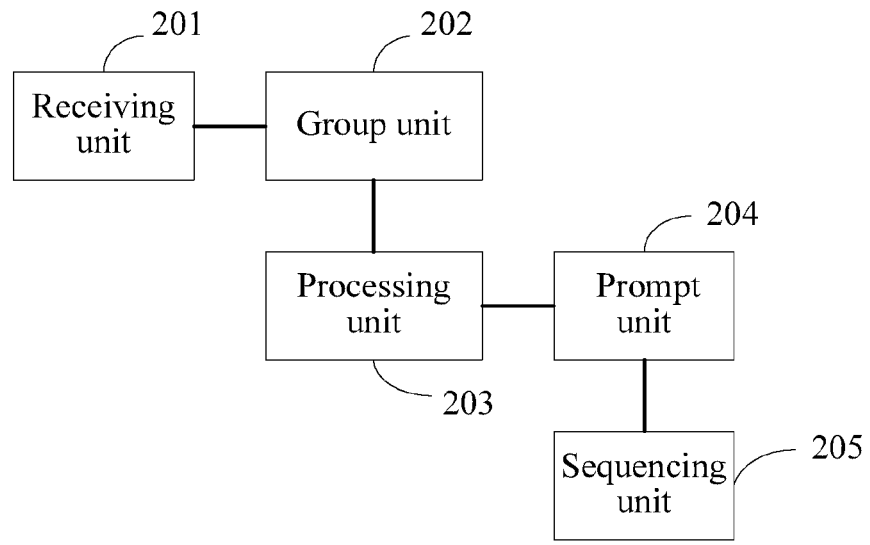
FIG. 3 is a schematic diagram of another apparatus according to Embodiment 2 of the present invention.

Furthermore, as shown in FIG. 3, the apparatus may further include: a sequencing unit 205, configured to, according to a predetermined arrangement rule, sequentially arrange information of other recipients in the recipient group, and send the information to the prompt unit 204 for prompting.

Figure 4:
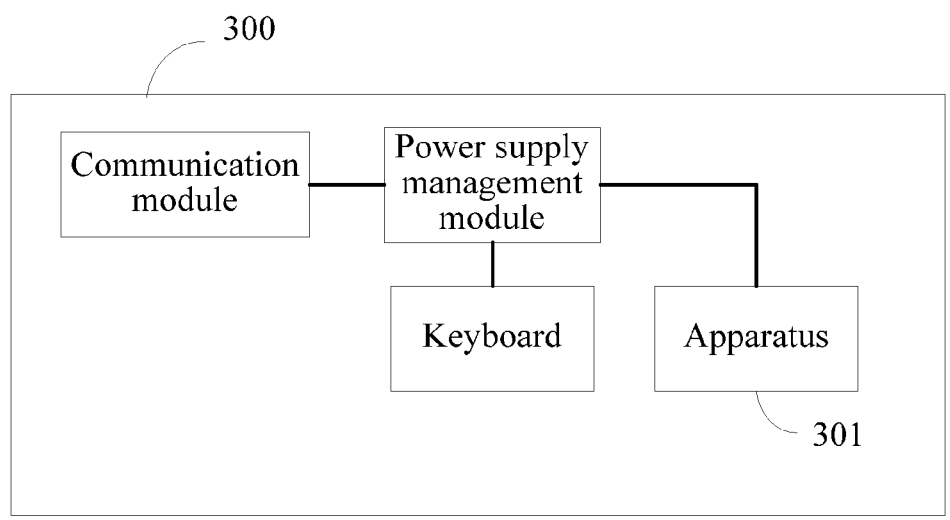
FIG. 4 is a schematic diagram of a mobile terminal according to Embodiment 2 of the present invention.

As shown in FIG. 4, an embodiment of the present invention further provides a mobile terminal 300, where the mobile terminal 300 includes a communication module, a keyboard and a power supply management module, and the mobile terminal further includes the above apparatus 301.

In the embodiment of the present invention, the technical solution of intelligently creating a recipient group; when a user needs to add a recipient to send a mail, if the added contact is in the recipient group, instructing the prompt unit to display information of other recipients in the recipient group; and prompting the user whether to add other recipients, makes an operation of adding a recipient quite flexible and intelligent, and provides an intelligent group contact recommendation function, so that the user can quickly add a contact when sending a mail or information.

The mobile terminal may be a terminal device such as a mobile phone with a touch screen, a personal digital assistant (PDA), a home information display (HID) and a mobile Internet device (MID).

Persons of ordinary skill in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (ROM), a Random Access Memory (RAM), or the like.

The foregoing description is merely about exemplary embodiments of the present invention, but is not intended to limit the present invention. Any modification, equivalent replacement, or improvement made within the idea and principle of the present invention should fall within the protection scope of the present invention.

What is claimed is:

1. A method for quickly adding a recipient, comprising:
   receiving mail information, wherein the mail information comprises information of at least two recipients;
   creating a recipient group according to the recipient information; adding a recipient to a mail;
   determining with a computer processor whether the recipient that has been added to the mail is in the recipient group;
   displaying information of other recipients in the recipient group when the recipient that has been added to the mail is determined to be in the recipient group; and
   prompting a user whether to add the other recipients,
   wherein the mail information comprises a short message received through a short message service center of a network side, wherein the recipient group is stored as a temporary group in a cache of the mobile terminal, wherein the recipient group is deleted from the mobile terminal when the mobile terminal is reset, wherein the prompt unit is configured to display the information of the other recipients in the recipient group by sequentially arranging and displaying the information of the other recipients in the recipient group according to a predetermined arrangement rule, wherein sequentially arranging the information of the other recipients according to the predetermined arrangement rule comprises arranging the information of the other recipients according to Chinese character strokes of the recipient information, and wherein the prompt unit is configured to prompt the user through voice.

2. The method according to claim 1, wherein displaying the information of the other recipients in the recipient group comprises sequentially arranging and displaying the information of the other recipients in the recipient group according to a predetermined arrangement rule.

3. The method according to claim 2, wherein sequentially arranging the information of the other recipients according to the predetermined arrangement rule comprises:
   arranging the information of the other recipients according to initials of the recipient information; or
   arranging the information of the other recipients according to Chinese character strokes of the recipient information.

4. The method according to claim 3, wherein prompting the user whether to add the other recipients comprises:
   prompting the user through voice; or
   prompting the user by displaying, on a screen, information to be added.

5. An apparatus for quickly adding a recipient, comprising:
   a receiving unit;
   a group unit;
   a processing unit; and
   a prompt unit,
   wherein the receiving unit is configured to receive mail information,
   wherein the mail information comprises information of at least two recipients,
   wherein the group unit is configured to create a recipient group according to the recipient information,
   wherein the processing unit is configured to add a recipient to a mail, determine whether the recipient that has been added to the mail is in the recipient group, and instruct the prompt unit to display information of other recipients in the recipient group when the recipient that has been added to the mail is determined to be in the recipient group,
   wherein the prompt unit is configured to, according to the instruction of the processing unit, display the information of the other recipients in the recipient group and prompt a user whether to add the other recipients, and
   wherein the mail information comprises a short message received through a short message service center of a network side, wherein the recipient group is stored as a temporary group in a cache of the mobile terminal, wherein the recipient group is deleted from the mobile terminal when the mobile terminal is reset, wherein the prompt unit is configured to display the information of the other recipients in the recipient group by sequentially arranging and displaying the information of the other recipients in the recipient group according to a predetermined arrangement rule, wherein sequentially arranging the information of the other recipients according to the predetermined arrangement rule comprises arranging the information of the other recipients according to Chinese character strokes of the recipient information, and wherein the prompt unit is configured to prompt the user through voice.

6. The apparatus according to claim 5, further comprising a sequencing unit configured to, according to a predetermined arrangement rule, sequentially arrange the information of the other recipients in the recipient group and send the information to the prompt unit for prompting.

7. A mobile terminal, comprising:
   a communication module;
   a power supply management module coupled to the communication module;
   a keyboard coupled to the power supply management module; and
   an apparatus for adding a recipient coupled to the power supply management module,
   wherein the apparatus comprises a receiving unit, a group unit, a processing unit, a prompt unit, and a sequencing unit,
   wherein the receiving unit is configured to receive mail information, wherein the mail information comprises information of at least two recipients,
   wherein the group unit is configured to create a recipient group according to the recipient information,
   wherein the processing unit is configured to add a recipient to a mail, determine whether the recipient that has been added to the mail is in the recipient group, and instruct the prompt unit to display information of other recipients in the recipient group when the recipient that has been added to the mail is determined to be in the recipient group,
   wherein the prompt unit is configured to, according to the instruction of the processing unit, display the information of the other recipients in the recipient group and prompt a user whether to add the other recipients, wherein the sequencing unit is configured to, according to a predetermined arrangement rule, sequentially arrange the information of the other recipients in the recipient group and send the information to the prompt unit for prompting, and wherein the mail information comprises a short message received through a short message service center of a network side, wherein the recipient group is stored as a temporary group in a cache of the mobile terminal, wherein the recipient group is deleted from the mobile terminal when the mobile terminal is reset, wherein the prompt unit is configured to display the information of the other recipients in the recipient group by sequentially arranging and displaying the information of the other recipients in the recipient group according to a predetermined arrangement rule, wherein sequentially arranging the information of the other recipients according to the predetermined arrangement rule comprises arranging the information of the other recipients according to Chinese character strokes of the recipient information, and wherein the prompt unit is configured to prompt the user through voice.

8. The method according to claim 1, wherein the mail information comprises a short message received through a short message service center of a network side.

9. The method according to claim 1, further comprising storing the recipient group as a temporary group in a cache of a mobile terminal, wherein the recipient group is deleted from the mobile terminal when the mobile terminal is reset.

10. The method according to claim 1, further comprising storing the recipient group as a permanent group in a memory of a mobile terminal, wherein the recipient group is maintained in the mobile terminal when the mobile terminal is reset.

11. The method according to claim 1, wherein the mail information comprises mail addresses of a first recipient, a second recipient, and a third recipient, wherein the address of the first recipient is added to the mail, and wherein the mail addresses of the second recipient and the third recipient are displayed when the address of the first recipient is added to the mail.

12. The method according to claim 1, wherein displaying the information of the other recipients in the recipient group comprises sequentially arranging and displaying the information of the other recipients in the recipient group according to a predetermined arrangement rule, and wherein sequentially arranging the information of the other recipients according to the predetermined arrangement rule comprises arranging the information of the other recipients according to initials of the recipient information.

13. The method according to claim 1, wherein displaying the information of the other recipients in the recipient group comprises sequentially arranging and displaying the information of the other recipients in the recipient group according to a predetermined arrangement rule, and wherein sequentially arranging the information of the other recipients according to the predetermined arrangement rule comprises arranging the information of the other recipients according to Chinese character strokes of the recipient information.

14. The method according to claim 1, wherein prompting the user whether to add the other recipients comprises prompting the user through voice.

15. The method according to claim 1, wherein prompting the user whether to add the other recipients comprises prompting the user by displaying, on a screen, information to be added.

16. The apparatus according to claim 5, wherein the mail information comprises a short message received through a short message service center of a network side, wherein the recipient group is stored as a temporary group in a cache of a mobile terminal, and wherein the recipient group is deleted from the mobile terminal when the mobile terminal is reset.

17. The apparatus according to claim 5, wherein the mail information comprises mail addresses of a first recipient, a second recipient, and a third recipient, wherein the address of the first recipient is added to the mail, and wherein the mail addresses of the second recipient and the third recipient are displayed when the address of the first recipient is added to the mail.

18. The apparatus according to claim 5, wherein the prompt unit is configured to display the information of the other recipients in the recipient group by sequentially arranging and displaying the information of the other recipients in the recipient group according to a predetermined arrangement rule, wherein sequentially arranging the information of the other recipients according to the predetermined arrangement rule comprises arranging the information of the other recipients according to Chinese character strokes of the recipient information, and wherein the prompt unit is configured to prompt the user through voice.

19. The mobile terminal according to claim 7, wherein the mail information comprises mail addresses of a first recipient, a second recipient, and a third recipient, wherein the address of the first recipient is added to the mail, and wherein the mail addresses of the second recipient and the third recipient are displayed when the address of the first recipient is added to the mail.

* * * * *